United States Patent Office 3,478,147
Patented Nov. 11, 1969

3,478,147
PHARMACOLOGICALLY EFFECTIVE SUBSTANCE AND PROCESS FOR PREPARING IT FROM RAVENSARA AROMATICA
Alfred Groebel, Kelkheim, Taunus, Germany, assignor to Farbwerke Hoechst Aktiengesellschaft vormals Meister Lucius & Bruning, Frankfurt am Main, Germany, a corporation of Germany
No Drawing. Filed Sept. 19, 1966, Ser. No. 580,208
Claims priority, application Germany, Sept. 22, 1965, F 47,259
Int. Cl. A61k 27/14
U.S. Cl. 424—195    6 Claims

ABSTRACT OF THE DISCLOSURE

A pharmacologically active substance isolated from the bark of Ravensara aromatica by steam distillation of the bark and solvent extraction of the distillate, or by solvent extraction of the bark, followed by isolation of the active substance from the extract by distillation or chromatography.

---

The present invention provides a pharmacologically effective substance and a process for preparing it.

We have found that a pharmacologically highly effective substance having a high antispasmodic and coronary-dilatatory activity can be obtained from the bark of Ravensara aromatica.

Ravensara aromatica is a plant belonging to the family Lauraceae which is found in Madagascar and is also known by the scientific names of Laurus aromatica and Agathophyllum ravensara.

The isolation of the substance is carried out according to methods known per se. For instance, the crushed bark can be subjected to steam-distillation and the steam distillate can be extracted, for example with ether or chloroform. After evaporation of the solvent, an oil remains behind which can be further purified, for instance chromatographically on silica gel using chloroform as eluant. By this procedure, three chromatographically uniform fractions are obtained, the middle one of which has spasmolytic and coronary-dilatatory activity. Instead of chromatographing the etheric or chloroformic extract of the steam distillate, it can also be subjected to fractional distillation in vacuo. Thus, there are also obtained three fractions, the middle one of which has a boiling point of 67°/1 mm. Hg and represents the desired substance.

A further method of obtaining the substance consists in extracting the thoroughly crushed bark with a suitable solvent, for instance ether, chloroform, methanol, ethanol, acetone or carbon tetrachloride, if desired after having removed the lipoid contents of the bark by extraction with petrol ether. After evaporation of the solvent, the active substance can be isolated from the extract as described above, for instance by fractional distillation in vacuo or by chromatographic separation.

The active substance obtained according to these methods is a colorless, slightly viscous liquid of sweetish odor having a boiling point of 67° C./1 mm. Hg or 71° C./5 mm. Hg, respectively. It is easily soluble in lower alcohols, aceton, chloroform, carbon tetrachloride and ether, but insoluble in water and petrol ether. In the ultra-violet spectrum, the methanolic solution shows three peaks at 225 m$\mu$ (log $\epsilon_1$=6.11), 278 m$\mu$ (log $\epsilon_2$=5.44) and 284 m$\mu$ (log $\epsilon_3$=5.38). The infra-red spectrum (in $CCl_4$) shows peaks at the following wave lengths: (the percentages of absorption are mentioned in parentheses): 2.85$\mu$ (5), 3.26$\mu$ (11), 3.45$\mu$ (24), 3.78$\mu$ (16), 6.10$\mu$ (23), 6.20$\mu$ (31), 6.30$\mu$ (17), 6.63$\mu$ (93), 6.85$\mu$ (31), 6.98$\mu$ (28), 7.31$\mu$ (6), 7.62$\mu$ (11), 7.70$\mu$ (31), 8.04$\mu$ (97), 8.53$\mu$ (40), 8.70$\mu$ (16), 8.80$\mu$ (14), 9.04$\mu$ (13), 9.68$\mu$ (48), 10.08$\mu$ (24), 10.96$\mu$ (34), 11.90$\mu$ (21), 12.09$\mu$ (22), 12.35$\mu$ (30), 13.15$\mu$ (14), 14.15$\mu$ (11).

The substance consists of C, H, and O. The elementary analysis shows the following approximate values:

C~61.6%
H~10.6%
O~27.1%

The specific rotation [$\alpha$] is O. Thin layer chromatography on silica gel yields $R_F$-values of 0.21 (with benzene as solvent) and 0.61 (with chloroform). When reacted with 2,4-dinitrophenyl hydrazine the substance forms brownish orange-red thin needles having a melting point of 150° (from ethanol), and with $NaHSO_3$ it forms a white coarsely crystalline precipitate having a melting point of 193° C. (decomposition; from water). Added bromine water is rapidly decolorized.

The compound obtained according to the present invention has a high spasmolytic and high coronary-dilatatory activity. For instance, it is capable of neutralizing, in a quantity of only 0.5$\gamma$ the spasmogenic action of 2$\gamma$ of Lentin (carbamic acid ester of choline) in the isolated intestine of the Guinea pig. According to the method of Langendorff, 20$\gamma$ of the substance cause a coronary dilatation of the Guinea pig's heart corresponding to that caused by 50$\gamma$ of the known 2-[1,1-diphenyl-propyl-(3)-amino]-1-phenyl-propane. With 10$\gamma$, a coronary dilatation of about 15% was observed during a period of 20 minutes.

The toxic doses are considerably higher than the therapeutic ones.

Owing to its excellent pharmacologic properties, the substance may be successfully used, for example, for the treatment of disorders of the blood circulation of the heart muscle and the peripheral vessels. Administration may be either orally or intra-arterially.

The following examples serve to illustrate the present invention, but they are not intended to limit it thereto.

EXAMPLE 1

210 grams of bark were crushed and subjected to steam-distillation. When the distillate had a volume of 1,000 ml., the distillation was discontinued and the distillate was shaken out with ether. The yellow ether solution was dried with $Na_2SO_4$. After the ether had been distilled off, an oil of a strongly aromatic odor (yield 13 mg.) remained. By means of thin-layer chromatography three substances could be discovered which became visible, by adding 2,4-dinitrophenylhydrazine, as yellow-red spots.

By means of chromatography on a silica gel column (25 grams of $SiO_2$) with chloroform as an eluant, the oil could be separated on the fraction collector into 3 components:

| Fraction | Mg. |
|---|---|
| 1 | 1.3 |
| 2 | 9.4 |
| 3 | 2.3 |

All fractions were chromatographically uniform. Fraction 2 had the high spasmolytic and coronary-dilatatory activity.

EXAMPLE 2

4.2 kilograms of drug (bark) were extracted with ether. The ether solution was dried with sodium sulfate, subsequently filtered and the ether was distilled off. A yellow-brown turbid oil (102 g.) remained which was fractionated in vacuo using a Raschig column of 30 cm. length.

Fraction 1:55° C./1 mm. Hg colorless.
Fraction 2:67° C./1 mm. Hg colorless.
Fraction 3:94° C./1 mm. Hg slightly yellowish.

The non-distillable remainder consisted of a tough brown syrup.

Fraction 2 was the active substance desired, the physical-chemical data of which corresponded to the data of fraction 2 from the silica gel-chromatography.

Yield: 50 frams.

The same result was obtained when using chloroform, carbon tetrachloride or lower alcohols instead of ether.

EXAMPLE 3

4 kilograms of drug (bark) were steam-distilled. The distillate was shaken out with ether, the etheric solution was dried, filtered and distilled. The remaining, yellow-brown, turbid oil was fractionated in vacuo as described above.

Yield: 45 grams.

I claim:

1. A process for preparing a pharmacologically active substance which comprises extracting the bark of *Ravensara aromatica* with an organic solvent selected from the group consisting of ether, chloroform, methanol, ethanol, acetone, and carbon tetrachloride, whereby an extract consisting essentially of three fractions is obtained, and then distilling the extract to isolate the active substance as the middle fraction of said three fractions.

2. A process as in claim 1 wherein, on distillation, that fraction boiling at 67° C./1 mm. Hg is collected.

3. A process for preparing a pharmacologically active substance which comprises extracting the bark of *Ravensara aromatica* with an organic solvent selected from the group consisting of ether, chloroform, methanol, ethanol, acetone, and carbon tetrachloride, whereby an extract consisting essentially of three fractions is obtained, and then chromatographically separating the extract on silica gel, using chloroform as an eluant, to isolate the active substance as the middle fraction of said three fractions.

4. A process for preparing a pharmacologically active substance which comprises steam-distilling the bark of *Ravensara aromatica*, extracting the distillate with an organic solvent selected from the group consisting of ether and chloroform, whereby an extract consisting essentially of three fractions is obtained, and then distilling the extract to isolate the active substance as the middle fraction of said three fractions.

5. A process for preparing a pharmacologically active substance which comprises steam-distilling the bark of *Ravensara aromatica*, extracting the distillate with an organic solvent selected from the group consisting of ether and chloroform, whereby an extract consisting essentially of three fractions is obtained, and then chromatographically separating the extract on silica gel, using chloroform as an eluant, to isolate the active substance as the middle fraction of said three fractions.

6. A pharmacologically active colorless liquid substance extracted from the bark of *Ravensara aromatica*, soluble in lower alcohols, acetone, chloroform, carbon tetrachloride, and ether, insoluble in water and petrol ether, and having the following other physical properties:

Composition: carbon, hydrogen, oxygen;

Elemental analysis: Percent
C _____ about 61.6
H _____ about 10.6
O _____ about 27.1

Boiling point: 67° C./1 mm. Hg;

Ultra-violet absorption maxima: 225, 278, 284 millimicrons;

Infra-red absorption:

| Microns | Percent |
|---------|---------|
| 2.85 | 5 |
| 3.26 | 11 |
| 3.45 | 24 |
| 3.78 | 16 |
| 6.10 | 23 |
| 6.20 | 31 |
| 6.30 | 17 |
| 6.63 | 93 |
| 6.85 | 31 |
| 6.98 | 28 |
| 7.31 | 6 |
| 7.62 | 11 |
| 7.70 | 31 |
| 8.04 | 97 |
| 8.53 | 40 |
| 8.70 | 16 |
| 8.80 | 14 |
| 9.04 | 13 |
| 9.68 | 48 |
| 10.08 | 24 |
| 10.96 | 34 |
| 11.90 | 21 |
| 12.09 | 22 |
| 12.35 | 30 |
| 13.15 | 14 |
| 14.15 | 11 |

Specific rotation $[\alpha]$:0;

$R_F$ values (thin layer chromatography on silica gel):
0.21 (benzene as solvent)
0.61 (chloroform as solvent);

Melting point of reaction product with 2,4-dinitrophenylhydrazine: 159° C.;

Melting point of reaction product with sodium bisulfite: 193° C. (decomposition).

No references cited.

ALBERT T. MEYERS, Primary Examiner

S. J. FRIEDMAN, Assistant Examiner